United States Patent [19]

Frania et al.

[11] 4,088,205
[45] May 9, 1978

[54] BRAKE CYLINDER WITH BUILT-IN SLACK ADJUSTER, INCLUDING MEANS FOR MANUALLY RESETTING PISTON TRAVEL

[75] Inventors: Josef Frania, Hanover; Erhard Lehnert, Dollbergen, both of Germany

[73] Assignee: WABCO Westinghouse G.m.b.H., Hanover, Germany

[21] Appl. No.: 751,544

[22] Filed: Dec. 16, 1976

[30] Foreign Application Priority Data

Jan. 21, 1976 Germany ............................ 2602052

[51] Int. Cl.² .............................................. F16D 65/56
[52] U.S. Cl. .................... 188/196 D; 92/31; 92/114; 92/128; 188/199; 188/203
[58] Field of Search ............. 188/71.9, 196 C, 196 D, 188/196 M, 199, 202, 203; 92/31, 114, 128

[56] References Cited

U.S. PATENT DOCUMENTS

| | | | |
|---|---|---|---|
| 3,043,406 | 7/1962 | Larsson | 188/196 D |
| 3,100,032 | 8/1963 | Larsson | 188/196 D |
| 3,899,053 | 8/1975 | Nadas | 188/196 D |
| 4,022,300 | 5/1977 | Afanador | 188/71.9 |

Primary Examiner—Trygve M. Blix
Assistant Examiner—Edward R. Kazenske
Attorney, Agent, or Firm—R. S. Visk; R. W. McIntire, Jr.

[57] ABSTRACT

A brake cylinder device for railway vehicles including a built-in automatic slack adjuster and a manually axially positionable piston for resetting the piston and piston rod relative to the slack adjuster when necessary, such as when replacing worn brake shoes, the piston rod being interconnected through a nut and screw, friction clutch, and a key to a manually rotatable member, which, when rotated causes axial displacement of the piston rod and piston to desired adjusted position relative to the slack adjuster.

2 Claims, 4 Drawing Figures

BRAKE CYLINDER WITH BUILT-IN SLACK ADJUSTER, INCLUDING MEANS FOR MANUALLY RESETTING PISTON TRAVEL

BACKGROUND OF THE INVENTION

An automatic slack adjuster provides for periodic adjustment of the release position of a screw-threaded piston rod of the brake cylinder, to compensate for brake shoe wear and thereby maintain a normal preset clearance between the brake shoes and the braking surface on the wheel when the brakes are in a released state. The screw-threaded piston rod is arranged with a coupling nut and a displacement nut, all of which are axially positionally adjustable relative to each other.

Since the automatic slack adjuster referred to herein is of conventional type and the details thereof are not considered essential to an understanding of the present invention, only a brief statement describing the manner of operation thereof will be given. When a brake application is effected, if the amount of piston and piston rod travel exceeds a certain increment of such travel predetermined to be compatible with the amount of travel needed to bring the brake shoes into contact with the braking surfaces of the wheel, resulting relative rotation between the displacement nut and the coupling nut cause an axial positional adjustment of the piston rod relative to the piston to compensate for the excessive travel of the piston rod and piston. This axial positional adjustment of the piston rod accumulates until the shoes are worn to a degree at which they must be replaced with new shoes. In order to provide the normal preset clearance between the new shoes, which are of full thickness, and the wheel surfaces, the brake rod must be axially reset, that is, retracted from its final adjusted position (the point at which the shoes are totally worn) to an initial position (the point at which the shoes were new).

Resetting of the piston rod, when the brake shoes are replaced, is normally accomplished manually. Some of the presently known arrangements for manually resetting the piston rod include a self-locking worm gear or other suitable gear by which the coupling and displacement nuts may be manually rotated from the exterior of the cylinder casing for retracting the piston rod to the initial position. Another presently known arrangement for resetting the piston rod includes a two-section cylinder casing, one section of which is fixed, and the other section of which, after loosening a locking device, is manually rotatable relative to the fixed section to cause rotation of the coupling and displacement nuts for resetting the piston rod.

A two-section cylinder casing is not desirable. Moreover, by nature the structures, as above described, involving a self-locking worn gear or the two-section cylinder casing with the lock mechanism therefor are complex and costly.

SUMMARY OF THE INVENTION

The object of the invention is to provide a simplified, dependable, less costly, manually operable piston rod resetting mechanism for an automatic slack adjuster built in a brake cylinder device.

The invention is for use with a brake cylinder having a built-in automatic slack adjuster of conventional type employing a displacement nut and a coupling nut carried coaxially on a screw-threaded piston rod and axially positionally adjustable relative to each other in accordance with the amount of piston travel when a brake application is made, whereby the piston rod is axially adjustable relative to the piston if the amount of said travel exceeds a certain predetermined increment. The invention is characterized by a tubular integral portion of the piston extending coaxially from the nonpressure side of the piston to terminate at the open end of the cylinder with a notched or knurled annular collar. Normally the tubular portion is locked against rotation during normal operation of the brake cylinder and slack adjuster. By unlocking the tubular portion and then manually rotating it by the notched end, the coupling and displacement nuts, through clutch surfaces formed on said tubular portion are rotated therewith as a unit on the nonrotatable piston rod which is thereby axially repositioned or reset to an initial position at which new brake shoes may be accommodated.

DESCRIPTION AND OPERATION

Figure 1:
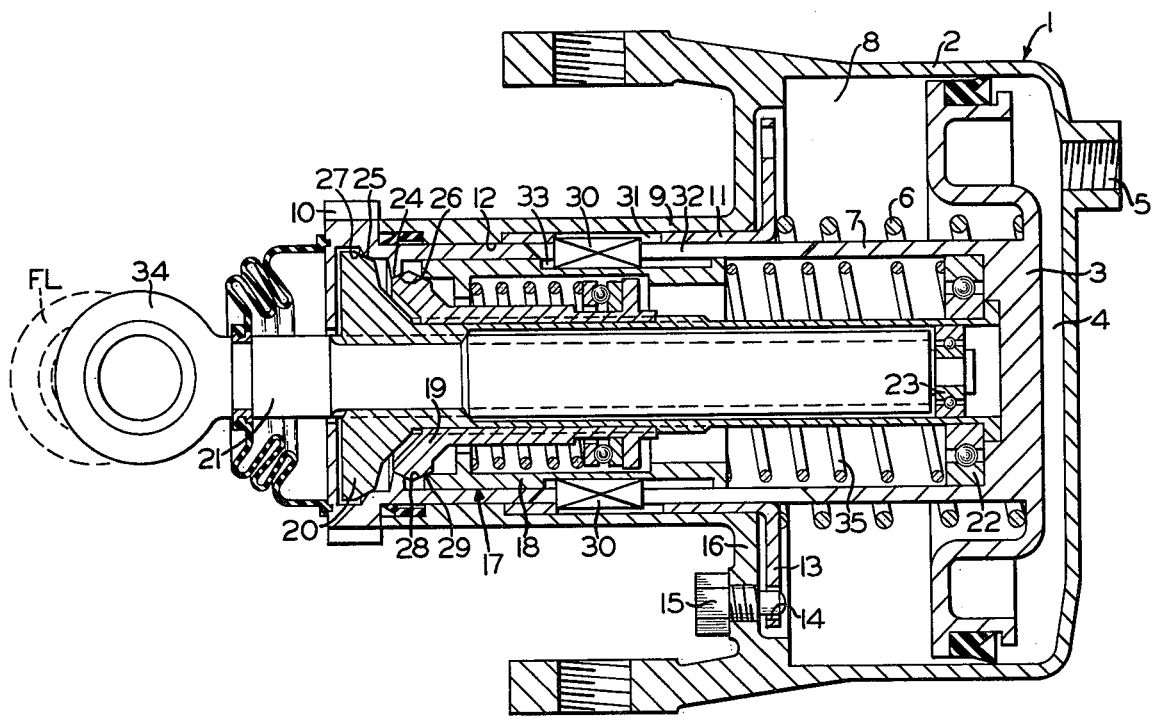
FIG. 1 is a plan view, in section, of a brake cylinder device embodying the invention.

FIG. 1 shows a fluid pressure operable brake cylinder device 1 for actuating brake shoes (not shown) of a railway vehicle wheel (not shown), said brake cylinder device including a casing 2 in which a piston 3 is axially movable in a leftwardly direction out of a brake release position, in which it is shown, when subjected to fluid pressure on one side adjacent a pressure chamber 4 formed by the piston and the casing, toward a brake applying position for effecting a brake application on the vehicle. Upon release of fluid pressure from chamber 4 via a port 5, via which the fluid pressure is also admitted, a return spring 6 acts to move piston 3 in a rightwardly direction and restore the piston to its brake release position for effecting release of the brake application.

A tubular portion or piston barrel 7 secured to a nonpressure side of piston 3 adjacent an atmospheric chamber 8 opposite pressure chamber 4, is of smaller diameter than said piston and extends coaxially through a correspondingly smaller diameter portion 9 of casing 2 and terminates exteriorly of said casing with a free end surrounded by an annular notched or knurled collar 10. One end of piston barrel 7 is coaxially slidable in a guide sleeve 11 coaxially disposed between said piston barrel and the end of smaller diameter portion 9 of casing 2 adjacent atmospheric chamber 8, the other end of said piston barrel being slidably guided in a reduced diameter bore 12 of said smaller diameter portion. Guide sleeve 11 is provided with a radial flange 13 having a plurality of openings 14 angularly spaced thereon, whereby a locking bolt 15 may be screwed through a radial wall 16 of casing 2 with the end of said bolt extending into an opposite one of said openings for locking the guide sleeve against rotation.

An automatic slack adjuster, designated generally by the reference numeral 17 comprises an adjusting sleeve 18 coaxially slidably disposed in piston barrel 7 in coaxially surrounding relation to a displacement nut 19 coaxially screw-threadedly carried on a hollow coupling nut 20 which, in turn, is coaxially screw-threadedly carried on a piston rod 21 extending into and through said hollow coupling nut. Coupling nut 20 is coaxially rotatable relative to both piston rod 21 and displacement nut 19 by having the inner end thereof supported in a ball bearing 22, but is axially fixed relative to piston barrel 7. The inner end of piston rod 21 is rotatably supported in hollow coupling nut 20 by a ball bearing 23 coaxially slidably disposed in said hollow coupling nut.

Piston barrel 7 is provided with internal annular clutch surfaces 24 and 25 engageable with complementary external clutch surfaces 26 and 27 of displacement nut 19 and coupling nut 20, respectively. Displacement nut 19 is provided with a second annular external clutch surface 28 engageable with an internal complementary clutch surface 29 formed on adjusting sleeve 18.

A plurality of keys 30 axially slidably disposed in longitudinal slots 31, 32, and 33 formed in guide sleeve 11, piston barrel 7, and adjusting sleeve 18, respectively, serves to lock said guide sleeve, piston barrel, and adjusting sleeve against rotation relative to each other. Moreover, with locking bolt 15 in place, as shown in FIG. 1, guide sleeve 11, piston barrel 7, and adjusting sleeve 18 are also locked against rotation as a unit.

Since slack adjuster 17 is of conventional type and functions in conventional manner well known to those skilled in the art, and since a detailed description of the operation thereof is not considered essential to an understanding of the present invention, it is considered sufficient to state that said slack adjuster operates automatically to adjust the axial position of piston rod 21 relative to piston 3 to compensate for wear of the brake shoes (not shown), so that said brake shoes, when in a release position, are spaced from the braking surface of the wheel (not shown) such as to provide the prescribed clearance therebetween. Piston rod 21 is provided with a clevis 34 for connecting said piston rod to brake rigging or levers not shown. Such connection prevents rotation of piston rod 21. Axial adjustment of piston rod 21 relative to piston 3 occurs when the travel of said piston must exceed a certain amount of travel normally necessary for bringing the brake shoes into braking contact with the wheel.

Each axial adjustment of piston rod 21 relative to piston 3 causes said piston rod to be incrementally and accumulatively extended outwardly of casing 2 in a left-hand direction until a final limit of such adjustment has been reached and at which the worn shoes must be replaced, such final limit being indicated graphically by a broken line extension of piston rod 21 labeled FL in FIG. 1. In order to provide sufficient clearance between the new shoes and the wheel, piston rod 21 must be reset by retraction thereof into casing 2 in a righthand direction to what may be called a new-shoe position, in which it is shown in FIG. 1 in solid outline and at which sufficient clearance is provided between the new shoes and the wheel.

Resetting of piston rod 21 is accomplished when the brakes are in a released state with all the several components of brake cylinder device 1 and slack adjuster 17 in the respective positions in which they are shown in FIG. 1. With brake cylinder 1 in a brake release disposition, a spring 35 compressed between ball bearing 22 and the inner end of adjusting sleeve 18 cooperates with return spring 6 in maintaining external clutch surfaces 27, 26, and 28 engaged with internal clutch surfaces 25, 24, and 29, respectively.

In order to reset piston rod 21 to its new-shoe position, above described, lock bolt 15 must first be removed, whereupon notched collar 10 is manually rotated in a direction opposite to that at which said piston rod is adjusted outwardly by slack adjuster 17. Manual rotation of collar 10 causes corresponding rotation of piston barrel 7, guide sleeve 11, adjusting sleeve 18, displacement nut 19, and coupling nut 20 as a unit due to the locking effect of keys 30 and the engaged clutch surfaces 25–27, 24–26, and 28–29. Since piston rod 21 is restrained from rotating by being connected to the brake rigging (not shown), rotation of coupling nut 20 relative to said brake rod causes corresponding relative axial displacement of the brake rod in a rightwardly direction and therefore retraction thereof into cylinder casing 2 until the new-shoe postion is attained. With piston rod 21 reset, as above described, lock bolt 15 is replaced in radial wall 16 of cylinder casing 2 so as to extend into the nearest one of the openings 14, thereby relocking guide sleeve 11, piston barrel 7, and adjusting sleeve 18 against rotation so that slack adjuster 17 may resume normal operation in effecting adjustment of travel of piston 3 and piston rod 21 as the newly replaced shoes wear.

Figure 2:
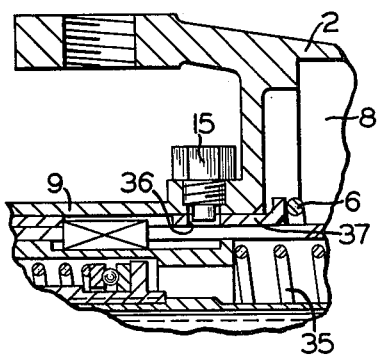
FIG. 2 is a fragmentary sectional view of a modified portion of the brake cylinder device shown in FIG. 1.

FIG. 2 merely differs from the structure shown in FIG. 1 in that locking bolt 15 is radially disposed through the cylindrical wall of casing portion 9 to extend into one of a plurality of openings 36 arranged peripherally around a guide sleeve 37, which replaces guide sleeve 11 shown in FIG. 1.

Figure 3:
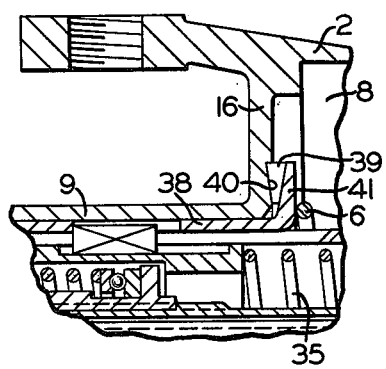
FIG. 3 is a fragmentary sectional view of a further modified portion of the brake cylinder device shown in FIG. 1.

FIG. 3 shows still another method of locking a guide sleeve 38 against rotation relative to casing 2. A friction ring 39 having a wedge shaped cross section is frictionally disposed in a complementarily wedge shaped annular groove 40 formed cooperatively between the radial wall 16 of casing 2 and a radial flange 41 of guide sleeve 38. Manual rotational force applied at collar 10 is sufficient for causing slippage of friction ring 39 and thereby rotation of guide sleeve 38 relative to casing 2 for resetting piston rod 21, as above described. With the structure thus shown in FIG. 3, it is not necessary to have a locking bolt such as locking bolt 15 shown in FIGS. 1 and 2.

Figure 4:
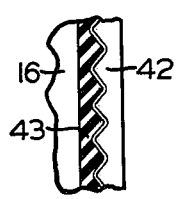
FIG. 4 is a fragmentary sectional view of a still further modified portion of the brake cylinder device shown in FIG. 1.

FIG. 4 shows yet another modification of a friction type arrangement for restraining relative rotation between casing 2, of which a portion of radial wall 16 is shown, and a guide sleeve of which only a portion of a radial flange 42 is shown. An annularly corrugated friction ring 43 may be bonded to radial wall 16 and have frictional contact with radial flange 42 which is complementarily corrugated. The cohesive friction between friction ring 43 and radial flange 42, as in the case of the structure shown in FIG. 3, may be overcome by manual rotation of collar 10 in effecting resetting of piston rod 21.

Having now described the invention, what we claim as new and desire to secure by Letters Patent, is:

1. A brake cylinder device comprising:
 (a) a fixed casing;
 (b) a piston reciprocably operable in said casing and effective upon movement in one axial direction for providing a brake-applying force;
 (c) a piston rod connected to said piston for axial movement therewith and being axially positionally adjustable relative thereto;

(d) automatic slack adjuster means including screw-threaded means providing a connection between said piston and said piston rod, and clutch means interposed between said screw-threaded means and said piston, said clutch means being engageable during movement of said piston in said one axial direction for inhibiting rotation of said screw-threaded means and being disengageable during axial movement of said piston in a return direction for effecting rotation of said screw-threaded means and consequent incremental and accumulative adjustment of the relative axial position between the piston and the piston rod in response to each axial movement of the piston in said one axial direction in excess of a certain predetermined increment, and for limiting axial movement of the piston to said predetermined increment during the next following axial movement in said one axial direction; and wherein the improvement comprises:

(e) a piston barrel having one end rigidly secured to said piston for axial movement therewith and extending coaxially therefrom with the opposite end extending exteriorly of the casing and accessible for manual rotation, said piston barrel being rotatably connected with said screw-threaded means through said clutch means and being effective, when manually rotated in one angular direction and acting through said clutch means, for effecting axial adjustment of said piston rod relative to said piston in an opposite direction relative to said one axial direction;

(f) a guide sleeve coaxially interposed between said casing and said piston barrel for guiding axial movement of the piston barrel and being keyed thereto for manual rotation therewith, said guide sleeve having a radial flange formed thereon and disposed in oppositely facing relation with a radial wall formed on said casing; and (g) an annular friction member of wedge-shaped cross-sectional area and disposed in a complementarily shaped annular groove formed cooperatively by said radial flange and said radial wall, said friction member being biasingly compressed therebetween for frictionally engaging the respective adjacent surfaces thereof and normally inhibiting relative rotation therebetween but being yieldable to manual rotational force applied to the piston barrel.

2. A brake cylinder device comprising:
(a) a fixed casing;
(b) a piston reciprocably operable in said casing and effective upon movement in one axial direction for providing a brake-applying force;
(c) a piston rod connected to said piston for axial movement therewith and being axially positionally adjustable relative thereto;
(d) automatic slack adjuster means including screw-threaded means providing a connection between said piston and said piston rod, and clutch means interposed between said screw-threaded means and said piston, said clutch means being engageable during movement of said piston in said one axial direction for inhibiting rotation of said screw-threaded means and being disengageable during axial movement of said piston in a return direction for effecting rotation of said screw-threaded means and consequent incremental and accumulative adjustment of the relative axial position between the piston and the piston rod in response to each axial movement of the piston in said one axial direction in excess of a certain predetermined increment, and for limiting axial movement of the piston to said predetermined increment during the next following axial movement in said one axial direction; and wherein the improvement comprises:

(e) a piston barrel having one end secured to said piston for axial movement therewith and extending coaxially therefrom with the opposite end extending exteriorly of the casing and accessible for manual rotation, said piston barrel being rotatably connected with said screw-threaded means through said clutch means and being effective, when manually rotated in one angular direction and acting through said clutch means, for effecting axial adjustment of said piston rod relative to said piston in an opposite direction relative to said one axial direction;

(f) a guide sleeve coaxially interposed between said casing and said piston barrel for guiding axial movement of the piston barrel and being keyed thereto for manual rotation therewith, said guide sleeve having a radial flange formed thereon and disposed in oppositely facing relation with a radial wall formed on said casing; and (g) an annular friction member bonded to one of said radial wall and said radial flange for making frictional contact with the other of said radial wall and said radial flange, said friction member and said other of said radial wall and said radial flange having complementarily engaging annular corrugations formed thereon and normally inhibiting relative rotation therebetween but being yieldable to manual rotational force applied to the piston barrel.

* * * * *